BINARY DIGITAL COMPARATOR

Filed Nov. 28, 1958

INVENTOR.
MARTIN RUBIN

BY John A Duffy 3,137,839
Patented June 16, 1964

3,137,839
BINARY DIGITAL COMPARATOR

Martin Rubin, Garden Grove, Calif., assignor to North American Aviation, Inc.

Filed Nov. 28, 1958, Ser. No. 776,803
2 Claims. (Cl. 340—146.2)

Figures 1, 2:
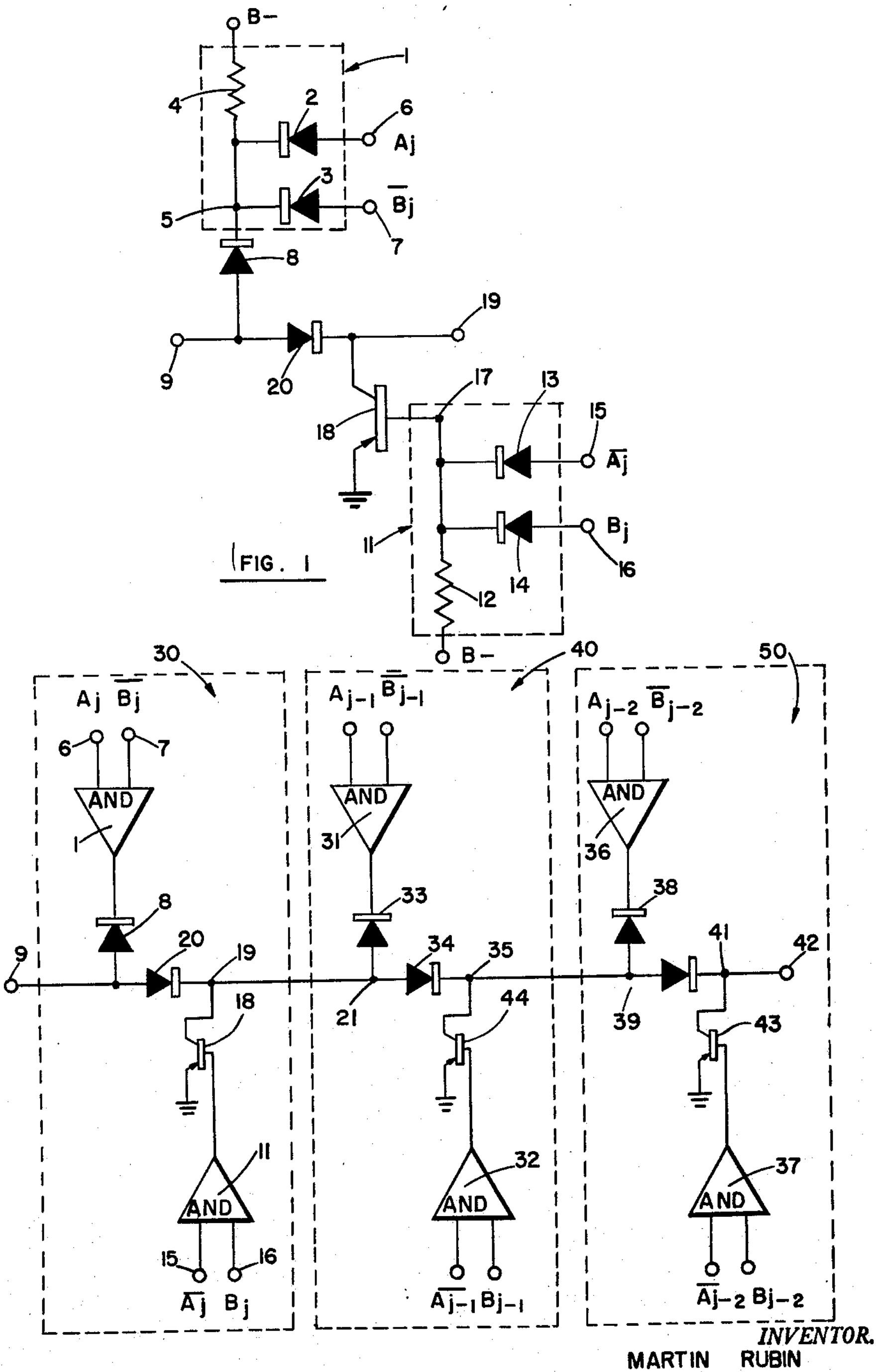

This invention relates to a system for determining the difference sense between two numbers and more particularly to a high speed binary parallel digital comparator for determining which of two binary numbers is the greater.

In automatic testing systems having digital operations for handling binary numbers there is frequently required a device to determine which of two numbers is greater. Thus, for example in an automatic checkout system a signal may be received from a device which has a particular value and it is desired to determine digit by digit whether the actual value received from the system under test is less than an established predetermined limit value. If the actual value developed from the testing of the device is greater than an established predetermined limit value then a signal is produced which indicates the failure of the tested device to meet the value set.

In digital computers presenting information in the form of a parallel array of binary coded events some orderly method of comparing the two arrays either term by term or simultaneously must be devised.

Present methods for comparing two binary digital numbers in parallel are inadequate. One method is to subtract a binary number from another number digit by digit and if a borrow term is developed from the circuitry then an indication is given as to which of the numbers is larger. This method employs complicated and extensive circuitry requiring excessive components. The number of "and" "or" gates required becomes prohibitively large for larger numbers having numerous digits therein. Additionally, limitations in speed of response resulting from inherent limitations in the complicated circuitry present another serious source of difficulty in such systems.

The device of this invention provides simple and efficient means having a fast response time for comparing two binary digital numbers. New and novel circuitry including less elements than heretofore provided produces an accurate output signal indicating which of two input signals is the larger.

According to the invention, a pair of numbers A and B coded in a binary digital form are fed in parallel through a plurality of stages corresponding to the number of digits in the binary numbers and are compared order by order and simultaneously to determine which of the numbers is larger.

Means are provided for combining the digits $A_j$ of one of the numbers order by order with the corresponding order complements $\overline{B}_j$ of the digits of the other number for producing a signal indicative of a true sense of the difference between the numbers wherein a true sense signal means that a digit $A_j$ of the number A is greater than the corresponding digit $B_j$ of the number B. Means are provided for combining the complements $\overline{A}_j$ of the digits of the one number with the corresponding order digits $B_j$ of the other number for producing a signal indicative of a false sense of the difference between the numbers wherein a false sense signal means that a digit $B_j$ of the number B is greater than the corresponding digit $A_j$ of the number A. Means are provided for transmitting a true sense signal from any order to an output terminal. Means responsive to a false sense signal from any given order is provided for blocking the transmission of true sense signals from lower orders to the output terminal. Thus, means are provided for permitting true sense signals from lower orders to pass any higher orders in which the corresponding digits are equal whereby a true sense signal at the output terminal from an order which is not blocked by any false sense signals from orders of higher significance determines that the one number is larger than the other.

It is therefore an object of this invention to provide an improved digital comparator.

It is another object of this invention to provide a high speed binary parallel digital comparator.

It is still another object of this invention to provide a circuit for determining which of a pair of digital numbers is the larger.

It is a further object of this invention to provide an improved binary parallel digital comparator.

Other objects will become apparent from the accompanying figures in which

FIG. 1 is a schematic diagram illustrating the circuitry for comparing one order of two binary numbers; and FIG. 2 is a schematic diagram partly in block illustrating the comparison of a pair of binary numbers having more than one order.

According to the device of this invention and the embodiments shown in FIGS. 1 and 2, it is desired to determine which of a pair of binary numbers is the larger. Assuming for purposes of explanation that one binary number is A and the other binary number is B, there are three relations that A may have to B. A can be greater than B, A can be equal to B, or A can be less than B. Thus for example, applying a digital comparator of the device of this invention in automatic test equipment, assume that A is the binary number representing the maximum limits and B is the binary number representing the value of the system tested. Then if A is greater than B, B has not exceeded the maximum limits, and conversely, if A is equal to or less than B then the maximum limit has been reached or exceeded.

Referring now to FIG. 1, there is shown the circuitry of the invention in which the comparison of a pair of binary digital numbers is made for one order, an order meaning the comparison of one digit of binary number, for example $A_j$, with the comparison of the other digit of binary number, for example $B_j$, with the subscript $j$ indicating the significance of the order of the digit in the number, for example the order of highest significance. In FIG. 1 there is shown an "and" gate 1 comprising diodes 2 and 3 and resistor 4 with a B— potential fed into resistor 4, a pair of input signals fed into terminals 6 and 7, and an output signal presented at terminal 5. "And" gate 1 is connected so that a comparatively negative voltage level signal indicative of binary 1 fed into terminal 6 and a comparatively negative voltage level signal fed into terminal 7 presents a negative voltage level signal at terminal 5 indicating that $A_j$ is greater than $B_j$. Any other combination such as for example a comparatively positive voltage level indicative of binary 0 at terminal 6 and a negative signal at terminal 7 indicative of binary 1 presents a comparatively positive voltage level signal at terminal 5 indicating that $A_j$ is less than or equal to $B_j$. "And" gate 1 has been selected to provide a comparatively negative value potential at its output representing the true sense signal and a comparatively positive potential representing in absence of a true sense signal for purposes of design only. It can readily be seen that a positive and negative signal could represent binary 1 and binary 0 respectively if desired by changes in design obvious to one skilled in the art. A negative signal is indicative of the binary 1 digit and a positive signal is indicative of binary 0 digit.

Assuming for example that the number A is being presented for comparison and the letter $j$ designates the $j$ order, then terminal 6 receives the digit $A_j$. Terminal 7 is connected to receive the digit which is equal to the complement of the $j$ order corresponding to number B, or $\overline{B}_j$. Thus, terminal 7 receives $\overline{B}_j$ indicating that terminal 7 is receiving the complement of the corresponding digit of number B. As has been explained previously, when it has been determined that the digit $A_j$ and the digit $\overline{B}_j$ are present, then negative voltages are applied to terminals 6 and 7 and terminal 5 presents a negative voltage, thus indicating the condition $A_j\overline{B}_j$ at terminals 6 and 7 and "and" gate 1 has presented a true sense signal at terminal 5. A positive signal at terminal 5 indicates that $A_j$ is not greater than $B_j$. Thus it may be seen that a positive signal at terminal 5 indicates that $A_j$ is either equal to or less than $B_j$. Terminal 5 is connected to the cathode plate of unidirectional diode 8 which has its anode plate connected to terminal 9. Thus, a true sense signal at terminal 5 is coupled to present a true sense signal at terminal 9 whereas a positive signal at terminal 5 is prevented by diode 8 from being coupled to terminal 9 and no signal is coupled to terminal 9 when a positive signal is received at terminal 5.

"And" gate 11, comprising diodes 13 and 14 and resistor 12, is connected to receive a pair of signals at terminals 15 and 16 and present an output signal at terminal 17. A B— potential is connected to one end of resistor 12 and the "and" gate is designed so that a negative voltage, or false sense signal, is presented at terminal 17 when a negative voltage representing signals indicative of $\overline{A}_j$ and $B_j$ are received at both terminals 15 and 16. Any other combination presents a comparatively positive potential at terminal 17. Terminal 15 is connected to receive the signal $\overline{A}_j$ which designates the complement of the digit A for the order $j$. Terminal 16 is connected to receive the signal $B_j$ which indicates the digit A for the order $j$. Thus, when both $\overline{A}_j$ and $B_j$ are received a negative output signal is presented at terminal 17 indicative of a false sense of the difference between $A_j$ and $B_j$. Otherwise a positive signal is presented at terminal 17. Thus when $A_j$ is greater than or equal to $B_j$ a positive signal is received by terminal 17. Terminal 17 is connected to the base of transistor 18 which has its emitter connected to ground and its collector connected to terminal 19 in common with the cathode plate of diode 20. Transistor 18 conducts presenting a relative low impedance when a negative voltage indicative of a false sense is received from terminal 17 and nonconducts or presents a high impedance to the flow of current when a positive voltage level signal is received from terminal 17. Thus when terminal 17 is at a negative voltage level indicating a false sense of the difference between $A_j$ and $B_j$, terminal 19 is effectively short-circuited to ground, thereby presenting a comparatively positive voltage level signal. Diode 20 is connected to couple negative voltage level or true signals from terminal 19 to terminal 9 and connected to block any positive or false signals from terminal 19 reaching terminal 9.

Voltage levels utilized in the device of FIG. 1, by way of example only, may be as follows: B—, 28 volts; negative voltage level, 6 volts; and positive voltage level, ground.

From principles of mathematics it can readily be shown that in comparing two digits representing two numbers it is only necessary to determine that the coincidence of $A_j$ and $\overline{B}_j$ has occurred in a more significant order than the converse $\overline{A}_k$ and $B_k$, where $k$ designates a less significant order than $j$, in order to determinne that the number A is larger than B. For example, if $A_j$ is equal to binary 1 and $B_j$ is equal to binary 0 then $A_j$ is 1 and $\overline{B}_j$ (the complement of $B_j$) is 1. Since both $A_j$ and $\overline{B}_j$ are 1 then it has been determined that $A_j$ is larger than $B_j$, and conversely, if $\overline{A}_k$ (the complement of $A_k$) wherein $k$ denotes any order less significant than $j$, and $B_k$ are both 1, then it has been determined that B is larger than A. Thus in the circuit of FIG. 1 it is apparent that the occurrence of negative signals at terminals 6 and 7 produces a true sense signal at terminal 9 which indicates that $A_j$ is larger than $B_j$, and conversely the occurrence of a negative signal at terminals 15 and 16 produces a false sense signal at terminal 17 indicating that $B_j$ is larger than $A_j$ which signal, through the means of responsive transistor 18, blocks all true sense signals of a lower order. On the other hand, the occurrence of a positive signal at either terminal 6 or 7 indicating that $A_j$ is either equal to or less than $B_j$ produces a positive signal which is blocked by diode 8. The occurrence of a positive signal at either terminal 15 or 16 produces a positive signal at terminal 17 indicating that $B_j$ is either equal to or less than $A_j$. The positive signal at terminal 17 maintains transistor 18 nonconductive thereby preventing any blocking signal from being present at terminal 19.

In operation assume for example a pair of binary digital numbers designated A and B are to be compared and the order being compared in FIG. 1 is the $A_j$ and the $B_j$ order and further assume that the $A_j$ order is binary 1 and the $B_j$ order is binary 0. The $A_j$ signal fed into terminal 6 corresponds to a signal indicative of binary 1. The $\overline{B}_j$ signal fed into terminal 7, which is the complement of binary 0 or again a negative signal. Thus a pair of negative signals are being fed into terminals 6 and 7 and terminal 5 presents a true sense signal which is coupled through diode 8 to output terminal 9. Terminal 9 presents a true sense signal indicating that the $A_j$ order is greater than the $B_j$ order or simply that 1 is greater than 0.

At the same time terminals 15 and 15 of "and" gate 17 are receiving signals $\overline{A}_j$ which is the complement of $A_j$ or equal to binary 0 and the signal $B_j$ which is also equal to binary 0. A positive potential level signal is presented at terminal 17 of "and" gate 11 which coupled to the base of transistor 18 effectively prevents the flow of current therein thus preventing input terminal 19 from going positive. Thus, in FIG. 1 when the order of A and B which is being compared is such that A is greater than B, the "and" gate 5 passes through diode 8 a true sense signal to output terminal 9 and the "and" gate 11 passes positive signal to terminal 17 which effectively cuts off transistor 8 thereby premitting any true sense signal at terminal 19 to be transmitted over diode 25 to output terminal 9.

Now assuming for example in FIG. 1 that $A_j$ is equal to binary 0 and $B_j$ is equal to binary 1, then it may readily be seen that a positive signal is received at terminal 6 and a positive signal is received at terminal 7, thereby presenting a positive signal at terminal 5. The signal (at a comparatively positive potential) at terminal 5 is prevented by diode 8 from reaching terminal 9 and no true sense signal is presented at terminal 9. "And" gate 11 receives at terminal 15 a negative signal ($\overline{A}_j=1$) and at terminal 16 a negative signal ($B_j=1$) thereby producing a false sense signal at the base of the transistor 18 by driving the terminal 17 to a negative potential. Transistor 18 then conducts into saturation thereby clamping point 19 to a comparatively positive potential (ground) thereby reverse biasing diode 20. Thus any true sense signal at point 19 is prevented from being passed to terminal 9.

Next assume for example in FIG. 1 that $A_j$ is equal to $B_j$, $A_j$ being binary 1 and $B_j$ being binary 1. A negative signal is received at terminal 6 and a positive signal is received at terminal 7. Terminal 5 receives a positive signal which is prevented by diode 8 from reaching terminal 9. "And" gate 11 receives at terminal 15 a positive signal ($\overline{A}_j=0$) and at terminal 16 a positive signal ($B_j=0$). Point 17 receives a positive signal which maintains transistor 18 nonconductive thereby preventing any blocking of a signal present at terminal 19.

In the circuit of FIG. 1 "and" gate 1 has been utilized to provide a true sense signal when the condition $A_j\overline{B}_j$ exists and to provide a positive signal when the condition $A_j\overline{B}_j$ does not exist. "And" gate 11 has been utilized to provide a false sense signal when the condition $\overline{A}_jB_j$ exists and to provide a positive signal when the condition $\overline{A}_jB_j$ does not exist. In other words, when $A_j$ is binary 1 and $B_j$ is binary 0 then "and" gate 1 presents a true sense signal at terminal 5 and "and" gate 11 presents positive signal at terminal 17.

When $A_j$ is binary 1 and $B_j$ is binary 1 or when $A_j$ is binary 0 and $B_j$ is binary 0 "and" gate 1 presents a positive signal at terminal 5 and "and" gate 11 presents a false sense signal at terminal 17. When $A_j$ is binary 0 and $B_j$ is binary 1 "and" gate 1 presents a positive signal at terminal 5 and "and" gate 17 presents a false sense signal at terminal 17. It may readily be seen by one skilled in the art that a variety of logical circuits could be utilized instead of "and" gates 1 and 11 to provide the necessary information to terminals 5 and 17. For example, "and" gate 11 could be replaced by a standard "or" gate receiving as its two inputs $A_j$ and $\overline{B}_j$. Then if either $A_j$ or $\overline{B}_j$ is binary 1 there is an output false sense signal. This false sense signal in fact indicates that the condition $\overline{A}_jB_j$ does not exist and may be used to control a transistor such as the transistor 18 shown in FIG. 1 but of opposite type. Thus it may be seen that only the signals $A_j$, $B_j$, and $\overline{B}_j$ would be required if an "or" gate in combination with an N-P-N transistor replaced "and" gate 11 and transistor 18.

Turning now to FIG. 2, there is shown a circuit for comparing a pair of numbers having a plurality of orders, for example three and gates 1 and 11 with corresponding input terminals and output terminals as those shown in FIG. 1. Diodes 8 and 20 are connected as shown in FIG. 1. Thus the stage $j$ which is equal to the most significant stage of the binary number to be compared is the block diagram indicated as 30. Dashed line 40 indicates a circuit comprising "and" gates, diodes, and a transistor connected in exactly the same way as that described for circuit 30, with terminal 19 of the circuit of 30 being connected to terminal 21, the output terminal of circuit 40. Circuit 40 compares the stage $j-1$ which is the next significant stage from $j$. Terminal 35 of circuit 40 is connected to terminal 39 of circuit 50 which is of identical circuitry with that of circuit 30 and compares the order $j-2$ which is the least significant order of the binary numbers to be compared. Thus it can be seen from the circuitry of FIG. 2 that three circuits identical with those in FIG. 1 are connected so as to compare three orders of a pair of binary numbers. It can readily be seen that terminal 42 of circuit 50 could be connected to a fourth and subsequent orders so that binary numbers having any number of orders may be compared if desired.

In operation assuming for example in FIG. 2 that the binary number A is equal to 101 and binary number B is equal to 010. From inspection it can readily be determined that A is equal to the decimal number 5 and B is equal to the decimal number 3. Therefore, A is larger than B. The circuit in FIG. 2 electronically determines this result in the following manner. The input terminals of circuits 30, 40, and 50, for example 6, 7, 15, and 16 of circuit 30, receive simultaneously in parallel the digits corresponding in significant order of the numbers A and B. For explanation purposes an analysis of the circuits 30, 40, and 50 will be taken up in the order of the least significant number first which is presented to circuit 50, it being understood that in actual operation the numbers are fed into circuits 30, 40, and 50 simultaneously. In circuit 50 "and" gate 36 receives at its input terminals the signal $A_{j-2}$ which is negative signal representing binary 1 and the signal $\overline{B}_{j-2}$ which is a negative signal representing binary 1. Thus "and" gate 36 transmits a true sense signal through diode 38 to terminal 39. At the same time "and" gate 37 of circuit 50 receives a signal $\overline{A}_{j-2}$ which is a positive signal representing binary 0 and the signal $B_{j-2}$ which is a positive signal representing binary 0. Thus a positive signal is presented at the output of "and" gate 37 which prevents transistor 43 from conducting thereby maintaining terminal 41 at a potential wherein signals from other lower orders not shown may be received through terminal 42. Thus it can be seen from the operation of circuit 50 that a true sense signal has been presented at 39 indicating that in the order $j-2$ of numbers A and B, A is larger than B.

Simultaneously circuit 40 compares the stage $j-1$ of binary numbers A and B wherein $A_{j-1}$ is equal to 0 and $B_{j-1}$ is equal to 1. Thus "and" gate 31 of circuit 40 receives at its input terminals the signal $A_{j-1}$ and the signal $\overline{B}_{j-1}$ both indicative of binary 0. Thus the output of "and" gate 31 is a positive signal and is prevented by diode 33 from reaching terminal 20. At the same time "and" gate 32 of circuit 40 receives a signal $\overline{A}_{j-1}$ which is equal to 1 and a signal $B_{j-1}$ which is equal to 1. Thus the output of "and" gate 32 is a false sense signal at a negative potential which causes transistor 44 to conduct thereby clamping point 35 to a relatively positive potential. The positive potential at terminal 35 prevents the true sense (or negative potential) signal at terminal 39 from being transmitted beyond point 35. Thus by reason of the fact that in order $j-1$ the number B was larger than the number A, point 35 of the circuit 40 prevents a true sense signal from being transmitted to the output terminal 9 from circuits of lower orders.

Circuit 30, compares the $j$ digits of the numbers A and B, $A_j$ being equal to 1, and $\overline{B}_j$ being equal to 1, to provide a signal at the output of "and" gate 1 which is a true sense signal coupled through diode 8 to terminal 9, gate 11 receiving an $\overline{A}_j$ signal and a $B_j$ signal which prevents transistor 18 from conducting thereby not affecting point 19.

Therefore, it can be seen from the combination of the operations of circuits 30, 40, and 50, by comparing each order of the three digit numbers A and B, it has been determined by reason of the true sense signal at terminal 9 that the number A is larger than the number B. Thus the circuit in FIG. 2 performs in the manner desired, namely that a true sense signal indicating that the order being examined is larger in A than in B, originating in a more significant order than a sense signal results in a true sense output signal.

The circuits described in FIGS. 1 and 2 operate in a fast and efficient manner with the only limitations on speed being the speed with which the transistors associated with each of circuits 30, 40, and 50 are switched. Since all information is handled in parallel the speed of operation of a number of cascaded orders connected to terminal 42 of FIG. 2 is the same as that of the single order shown in FIG. 1.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A digital comparator for determining which of a pair of binary numbers is greater comprising a first plurality of gate means corresponding in number to the number of digital orders of said binary numbers, each said first gate means having a pair of input terminals respectively connected to be responsive to a digit of one of said numbers and the complement of the corresponding order digit of the other of said numbers, each of said first gate means having an output terminal for producing a negative signal indicative of the coincidence of binary "1" digits at both said input terminals of each of said first gate means, a second plurality of gate means corresponding in number to the number of digital orders of said binary numbers, each said second gate means having a pair of input terminals respectively connected to be responsive to the complement of a digit of one of said numbers and the digit of the corresponding order digit of the other of said numbers, each of said second gate means having an output terminal for producing a negative signal indicative of the presence of coincidence of binary "1" digits at both said input terminals of each of said second gate means, a diode switch for each digital order, each said diode switch having a cathode and an anode, said anode responsively connected to the output terminal of a corresponding first gate means, a transistor switch for each digital order, each said transistor switch operatively responsive to negative signals from the output terminal of a corresponding second gate means to present a positive signal to said cathode, said cathode responsively connected to the output terminal of the next lower order first gate means, whereby said diode switch presents negative signals from the output terminals of lower order first gate means to output terminals of upper order first gate means in the absence of a positive signal from a corresponding transistor switch, and a comparator output terminal connected to the anode of the diode switch for the most significant digital order of said binary numbers being compared.

2. A digital comparator for determining which of a pair of binary numbers is greater comprising a first plurality of gate means corresponding in number to the number of digital orders of said binary numbers, each said first gate means having a pair of input terminals respectively connected to be responsive to a digit of one of said numbers and the complement of the corresponding order digit of the other of said numbers, each of said first gate means having an output terminal for producing a true sense signal indicative that the digit of the first number is greater than the corresponding order digit of the second number, a second plurality of gate means corresponding in number to the number of digital orders of said binary numbers, each said second gate means having a pair of input terminals respectively connected to be responsive to the complement of a digit of one of said numbers and the digit of the corresponding order digit of the other of said numbers, each of said second gate means having an output terminal for producing a false sense signal indicative that the digit of the second number is greater than the corresponding order digit of the first number, a plurality of serially connected diodes for coupling the output terminals of said first plurality of gate means in series, a given one of said diodes coupling the output terminal of one of said first plurality of gate means responsive to digits of a given order to the output terminal of another of said first plurality of gate means responsive to digits of the next order of higher significance, a plurality of switch means, a given one of said plurality of switch means coupling the output terminal of one of said second plurality of gate means responsive to digits of a given order to the output terminal of one of said first plurality of gate means responsive to digits of the next order of lower significance, said given one of said plurality of switch means being responsive to a false sense signal produced at the output terminal of said one of said second plurality of gate means for shunting any true sense signal produced at the output terminal of said one of said first plurality of gate means responsive to digits of the next order of lower significance or coupled thereto from others of said second plurality of gate means responsive to digits of orders of lower significance by others of said first plurality of switches serially connected; and a comparator output terminal connected to the output terminal of the one gate means of said first plurality of gate means responsive to the most significant order digits of said numbers being compared.

References Cited in the file of this patent

UNITED STATES PATENTS

| | | |
|---|---|---|
| 2,749,440 | Cartwright | June 5, 1956 |
| 2,821,696 | Shiowitz et al. | Jan. 28, 1958 |
| 2,885,655 | Smoliar | May 5, 1959 |
| 2,889,534 | Lubkin | June 2, 1959 |
| 2,900,620 | Johnson | Aug. 18, 1959 |
| 2,923,475 | Ketchledge | Feb. 2, 1960 |
| 2,946,983 | Borders | July 26, 1960 |
| 3,000,001 | Brink | Sept. 12, 1961 |